United States Patent

Weaver et al.

[15] 3,663,040
[45] May 16, 1972

[54] SMALL BOAT CARRIER

[72] Inventors: Chester H. Weaver, 184 Kingston Park Road, Baltimore, Md. 21220; Charles C. Hoffberger, Apt. 59, 200 Cross Keys Rd., Baltimore, Md. 21210

[22] Filed: June 18, 1970

[21] Appl. No.: 47,183

[52] U.S. Cl. ..................................280/414 R, 280/43.23
[51] Int. Cl. ..............................................B62d 53/00
[58] Field of Search....................280/414 R, 423, 43.23; 214/390, 38.46; 9/1 TR

[56] References Cited

UNITED STATES PATENTS

| | | | |
|---|---|---|---|
| 3,572,743 | 10/1969 | Parr | 280/43.23 |
| 3,442,409 | 5/1969 | Larson | 280/423 |
| 3,410,569 | 11/1968 | Blake | 280/43.23 |

Primary Examiner—Benjamin Hersh
Assistant Examiner—Robert R. Song
Attorney—Sidney W. Russell

[57] ABSTRACT

The invention is a small boat carrier or straddle-type trailer for boat yard use. The carrier is characterized by a single unitary open-ended horizontal U-frame which rides upon a pair of independent opposing multiple wheeled truck units disposed beneath the port and starboard after ends of the U-frame. The forward or closed end of the U-frame rides upon a free-wheeling swivel-mounted dolly unit which can be coupled to a tow truck or small tractor. The U-frame can be raised or lowered by one or more hydraulic rams which comprise extensible frame supporting means interposed between the truck units and the superjacent U-frame. Being devoid of load-bearing cross-members, the U-frame alone constitutes the sole structure which supports the hull of the boat to be moved. To operate, the carrier is backed into position beneath a boat and straddling the fixed support upon which the boat rests. The U-frame is hydraulically elevated to lift the boat clear of the fixed support, and the entire assembly is then ready for towing to another location.

7 Claims, 8 Drawing Figures

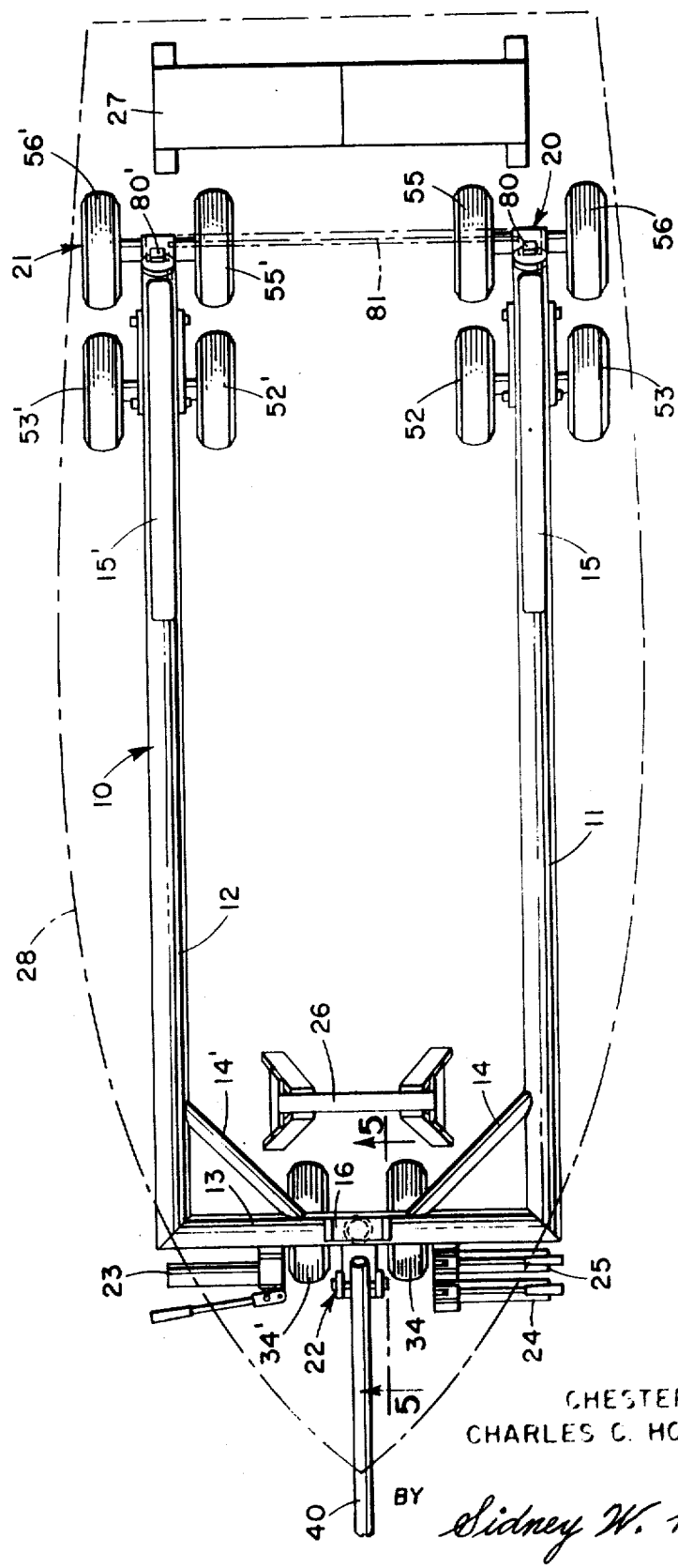

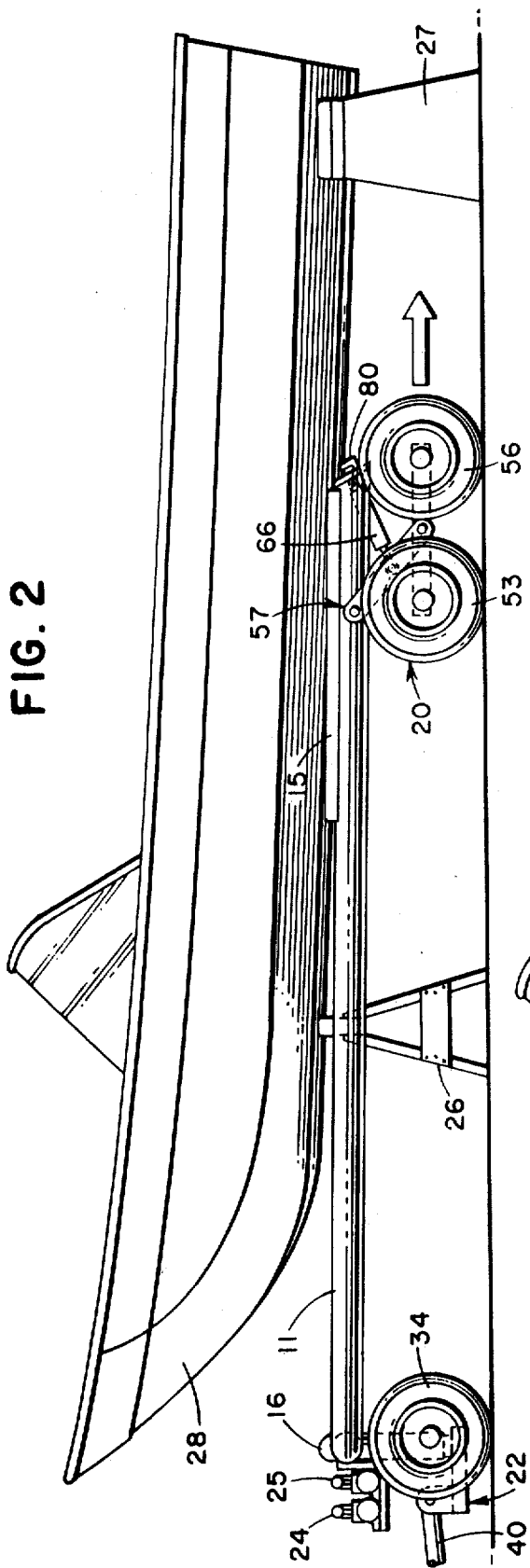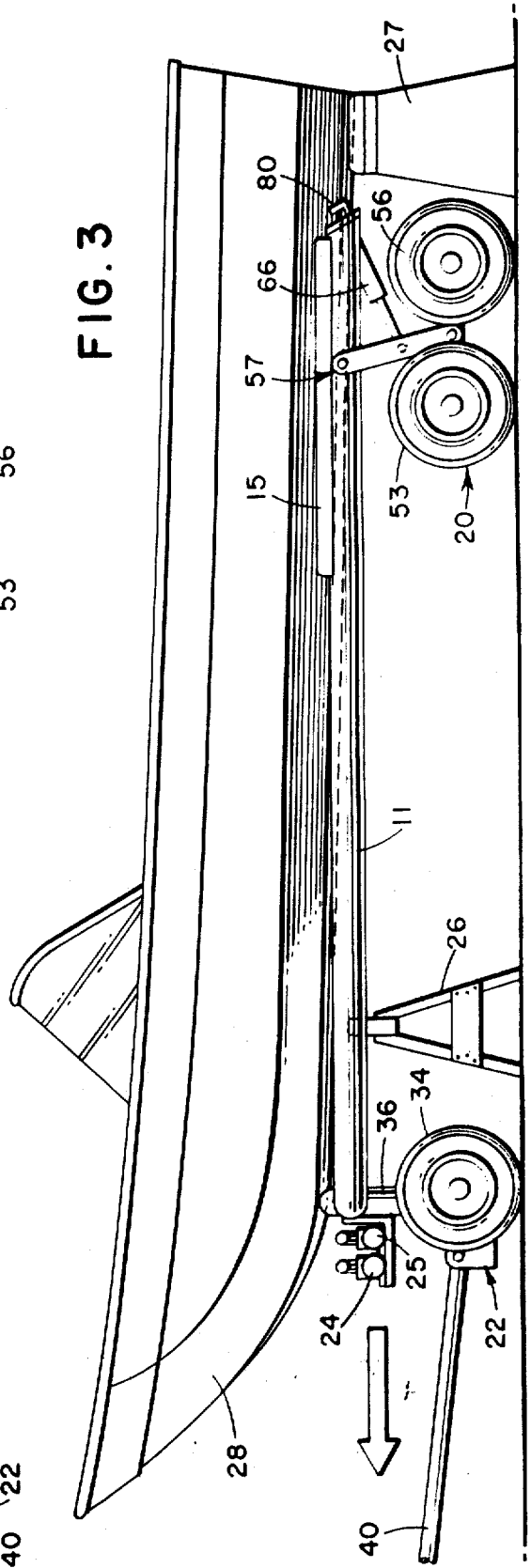

SMALL BOAT CARRIER

BACKGROUND OF THE INVENTION AND PRIOR ART

The present invention relates broadly to the art of opposed shelf-type elevator transporters. The invention is more particularly addressed to a self-loading straddle-type carrier or trailer especially designed to move small boats from one place to another within and about a commercial boat yard.

The past decade has witnessed impressive growth in the pleasure craft and yachting industries. There has naturally been a markedly increased demand by the boating public for the services of boat yards and related facilities. The limited availability of suitable waterfront sites, however, prevented a responsive increase in the number of new yards as well as in the size of existing yards. Consequently, storage space is at a premium and present day yards are, almost without exception, extremely crowded. In addition, the services provided by many boat yards include not only the traditional functions of storage and repair, but also the sale and display of new and used boats. These activities require that boats be constantly shuttled about from one place to another in a boat yard, i.e., from a typically high density storage area to a show room or to used or new boat display lots. A very common occasion is that of moving a one or two ton boat a relatively short distance; three or four men are usually required for the job, together with a mobile crane and a heavy trailer. The process is not only time-consuming but expensive in view of high labor costs and the utilization of sophisticated moving equipment for even relatively light loads. There is, therefore, an immediate need for improved and simplified boat transportation apparatus designed for the special task of moving small boats short distances in and out of crowded situations in a boat yard.

The prior art has recognized this need to a limited extent. At least one specially designed boat carrier has been suggested to meet the problem. Such apparatus employs pneumatically powered rotatable longitudinal beams astraddle the hull which in turn support and elevate a plurality of longitudinally spaced disconnectable transverse load bearing crossbars. All of the crossbars must be manually removed before the main trailer portion can be backed into position beneath the boat in order to clear the fixed boat supporting means. The crossbars are then manually reinserted so as to be athwart and beneath the keel of the boat. Only then can the assembly be elevated to lift the boat free of its fixed support. Since the boat when raised rides upon its keel, it is inherently unstable and auxiliary supports are required to stabilize the load. Such a procedure obviously entails a good deal of work and does not significantly reduce labor costs. Another drawback to this prior art apparatus is that it cannot easily accomodate boats the fixed support of which is a more or less continuous cradle type of support, such as one constructed of stacked railroad crossties. In the latter instance it is often necessary to partially disassemble the cradle before the load-bearing crossbars can be inserted to support the hull, thus further increasing the labor involved. Another prior art apparatus which at first blush might appear adaptable for moving small boats comprises two nested U-frames, the outer frame being a non-elevatable wheeled carriage or chassis member, and the inner frame being the elevatable load-bearing member. Such a design, however, is unduly cumbersome and heavy. It requires at least two men to operate. And it is of necessity wider than the beam of the largest boat for which it is designed, hence is not suitable for crowded areas.

OBJECTS OF THE INVENTION

It is a principal object of our invention to provide a boat carrier which is light and durable and requires no special skills to operate.

It is another object of our invention to furnish a boat carrier which is particularly designed to move small boats in and out of crowded areas in a boat yard.

It is a further object of our invention to provide a boat carrier which can be operated by a single workman.

It is still another object of our invention to disclose a boat carrier which is no wider than the beam of the boat to be moved.

It is a more particular object of our invention to describe a boat carrier having a maximum load capacity of approximately 4,500 to 5,000 lbs. and accomodating a maximum boat length of up to about 24 feet.

Still another object of our invention is to disclose a boat carrier which is extremely maneuverable so that the entire carrier with boat upon it can be moved into or out of a space exactly the width of the boat or exactly the width of the carrier.

A still further object of our invention is to provide a straddle-type boat carrier in which the sole boat supporting structure is a horizontal U-frame, the legs of the U contacting the hull on either side of the keel and parallel therewith to furnish a stable support.

Another more specific object of our invention is to provide a boat carrier in which the after mobile supports comprise multiple wheeled tandem-type trucks which are pivotally connected to the U-frame, thus affording a smooth ride over rough terrain and eliminating the need for springs.

These and other objectives and advantages of our invention will be apparent to those skilled in the art in light of the detailed description of the invention to follow.

SUMMARY OF THE INVENTION

A broad embodiment of our invention relates to a boat carrier comprising a substantially horizontal U-frame defined by a pair of laterally spaced apart substantially parallel port and starboard longitudinal beams and a transverse beam connecting the forward ends of the longitudinal beams. The after end of the U-frame is open and the area bounded by the U-frame is unobstructed from its after end throughout substantially its entire length. A first wheeled truck unit is positioned beneath the port beam. A second wheeled truck unit is positioned beneath the starboard beam, and the space between said first and second truck units is unobstructed. First and second extensible frame supporting members each connect a corresponding truck unit with and support its respective superjacent longitudinal beam. At least one of such frame supporting members includes an upwardly extensible hydraulic ram or operator arranged to elevate the longitudinal beam relative to the truck unit. A fluid dispensing means provides controlled volumes of fluid under pressure to the hydraulic ram or rams, said dispensing means in combination with the hydraulic ram means being operative to raise or lower said U-frame in a substantially horizontal plane. The U-frame is further characterized in that said longitudinal beams, either alone or together with said forward transverse beam, constitute the sole members of the boat carrier which contact and support the hull of the boat to be transported.

The term "U-frame," as employed herein and in the appended claims, is intended to denote not only a frame having a rectangular or box-like forward end, but it includes other geometric configurations as well. That is to say, the forward transverse beam member can be semi-circular, semi-elliptical or of other arcuate shape, or it may be V-shaped to conform approximately with the bow portion of the hull of the boat to be transported. It is, however, an important and distinguishing facet of our invention that the after end of the U-frame is open and the area bounded by the U-frame is unobstructed from its after end throughout substantially its entire length. Stated otherwise, the rectangular parallelpipedal volume bounded by the U-frame in the upper plane, and by the vertical projection of the U-frame on the ground in the lower plane, is substantially unobstructed, save for the optional slight protrusion into such volume of certain of the vehicle wheels. This is a prime requisite of the invention so that, when it is backed into position beneath a boat, it will freely clear the fixed boat support means and be immediately operational to lift the boat, all without having to disassemble and reassemble any load-bearing crossbars and without having to disturb the fixed boat support means. It is also an important characteristic of the invention that the longitudinal beam members of the U-frame, either alone or together with the forward transverse beam member, constitute the sole members of the boat carrier which contact and support the hull of the boat to be transported. Such an arrangement, precluding the use of beam-loaded crossbars, ensures that the hull will be supported by the longitudinal beam elements along laterally spaced apart lines of contact which are parallel with the keel and at a slightly higher elevation than the keel, thereby assuring that the boat when raised will comprise a relatively stable load which is substantially restrained from a rolling motion relative to the U-frame.

A further significant feature of our invention is that the U-frame is carried by a pair of laterally spaced apart, independent truck units which are preferably positioned beneath the after end portions of the U-frame. This construction eliminates the need for a separate vehicle chassis member which in turn permits the vehicle to be of minimum width. Although each after truck unit may have as few as one or two wheels, it is preferred that each truck per se comprise a stable mobile platform, i.e., one having at least a three-point contact with the ground. Therefore, each after truck unit preferably comprises at least three wheels, at least two of which wheels are laterally spaced apart upon a first common axis of rotation. At least one other wheel has a second axis of rotation which is longitudinally spaced from the first axis of rotation, and both the first and second axes of rotation are perpendicular to the longitudinal beam members. In a distinctly preferred embodiment of our invention, each after truck has two pairs of wheels arranged in tandem in a manner similar to aircraft landing gear. A more specific refinement of the after truck units involves their interconnection with the extensible frame supporting members in such a manner as to permit each truck to undergo at least a limited free oscillation or rocking movement in the vertical plane relative to the U-frame about a horizontal axis (sometimes referred to as "pitch") whereby to minimize the amplitude of vertical displacements which may be imparted to the U-frame when the boat carrier is traversing a bumpy ground. Another specific refinement of the after truck units involves their interconnection with the extensible frame supporting members in such a manner as to substantially preclude oscillatory rotation or swivel motion of the truck unit about a vertical axis (sometimes referred to as "yaw") whereby proper alignment of the longitudinal beams relative to the boat can be readily maintained, and control of degree of turn is singularly determined by a third or forward dolly truck unit.

In a preferred embodiment of the invention, there is provided a forward dolly truck, comprising at least one and preferably at least two laterally spaced apart wheels, such dolly truck unit being positioned beneath the forward transverse beam member at a locus preferably midway between the longitudinal beam members. The dolly truck is connected with the transverse beam member by a vertical telescoping compression member, such compression member desirably being constructed and arranged to permit substantial rotation of the dolly truck relative to the forward line of travel, and will preferably be such as to permit at least about a ±90° rotation of the dolly truck unit relative to forward line of travel. Thus, the turning radius of the boat carrier is not materially greater than its own axle-to-axle length.

As previously indicated, at least one of the extensible frame supporting members which connect the after truck units with their respective superjacent longitudinal beam members will also comprise an upwardly extensible hydraulic ram or linear hydraulic operator. Preferably, both of the after extensible frame supporting members will include a hydraulic ram means operatively associated therewith. Still more preferably, the aforesaid telescoping compression member which supports the transverse beam member upon the forward dolly truck unit will also include an upwardly extensible hydraulic ram means. Therefore, in a distinctly preferred embodiment of the invention, the entire U-frame can be subjected to lifting vectors applied at the vertices of an isosceles triangle, two at the after ends of the U and the third at the forward or closed end of the U. The term "hydraulic," as employed herein and in the appended claims, comprehends the use both of incompressible hydraulic fluid, e.g., oil, and also gas under superatmospheric pressure such as compressed air, compressed nitrogen and gaseous carbon dioxide which may be supplied from a reservoir of liquid or solid $CO_2$. It is preferred, however, that the hydraulic system be filled with a normally liquid hydraulic medium, such as oil, which can be supplied in controlled volumes to the hydraulic ram members by one or more manually operated or motor driven hydraulic pumps.

DESCRIPTION OF THE DRAWINGS

The structure and mode of operation of our invention may be more fully described and better understood by reference to the accompanying drawings in which:

FIG. 1 is a plan view of the boat carrier.

FIG. 2 is a side elevation view of the boat carrier in a retracted or unloaded position.

FIG. 3 is a side elevation view of the boat carrier in an elevated, load supporting position.

DETAILED DESCRIPTION OF THE INVENTION

Figure 4:
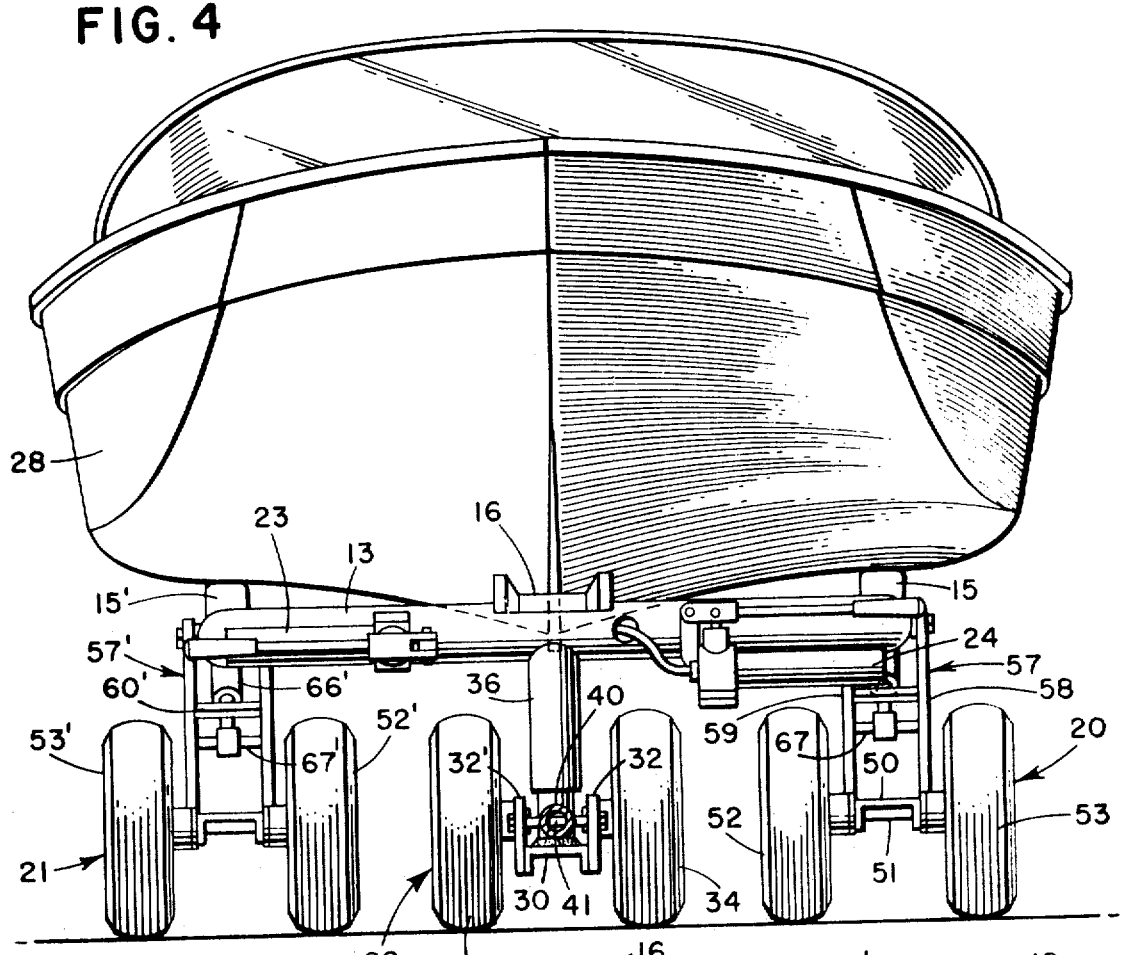
FIG. 4 is a front elevation view of the boat carrier.

With reference now to FIG. 1, the boat carrier comprises a horizontal U-frame, denoted generally by numeral 10, which in turn is made up of a port longitudinal beam member 11, a starboard longitudinal beam member 12 and a forward transverse beam member 13. By way of illustration, these three elements can be formed of 3-inch ID steel pipe, all connections being welded unless otherwise indicated. As explained more fully hereinbelow, the U-frame may be subject to "spreading," under certain conditions, and therefore to reinforce and rigidify the U-frame there are provided short diagonal struts or braces 14 and 14' across the 90° angles. These strengthening braces remain out of contact with the boat hull and are subject to tensile loading only; in lieu thereof, one may employ gusset plates or other equivalent structure. Disposed along the top of the after end portions of beams 11 and 12 are hull pads or cushions 15, 15'. These pads may be formed of cotton batting, sponge rubber, open cell foamed plastic or any other soft resilient material. A keel rest 16 is secured to the middle of the forward transverse beam 13.

An after port truck unit, denoted generally by numeral 20, is positioned beneath the after end of beam 11. This truck is fitted with four pneumatic rubber tired wheels arranged in tandem: a front inboard wheel 52, a front outboard wheel 53, a rear inboard wheel 55 and a rear outboard wheel 56. The construction of this truck, as well as its associated frame support and elevating means, will be more particularly described hereinbelow. An after starboard truck unit, denoted generally by numeral 21, is positioned beneath the after end of beam 12. Truck 21 is identical to port truck 20 and is similarly fitted with four pneumatic tired wheels arranged in tandem: a front inboard wheel 52', a front outboard wheel 53', a rear inboard wheel 55', and a rear outboard wheel 56'. A forward dolly truck unit, denoted generally by numeral 22, is positioned beneath the midpoint of forward transverse beam 13. Dolly 22 is provided with two pneumatic rubber tired wheels: port wheel 34 and starboard wheel 34'. The construction of dolly 22, as well as its associated frame support and elevating means, will be more particularly described hereinbelow. Three hydraulic hand pumps 23, 24, and 25 are mounted upon the forward transverse beam 13. These pumps deliver controlled volumes of high pressure hydraulic fluid through small bore copper tubing to three corresponding hydraulic rams operatively associated with the after port and starboard trucks and the forward dolly truck. Pump 23 operates a ram at the forward axle, pump 24 operates a ram at the starboard after truck and pump 25 operates a ram at the port after truck. Each of these pumps is equipped with check and release valves and is of conventional design. Thus, any of the three extensible frame supports can be raised or lowered at will from the operator's position at the front end of the boat carrier.

Figure 5:
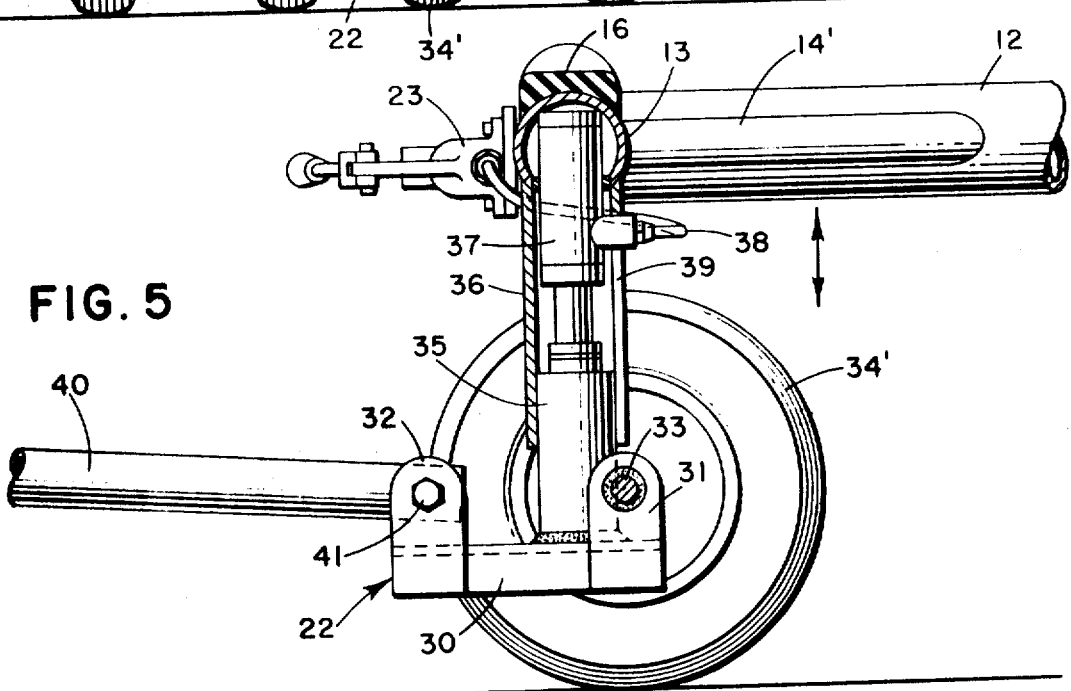
FIG. 5 is an enlarged side elevation view of the forward dolly assembly taken along 5—5 of FIG. 1.
Figure 6:
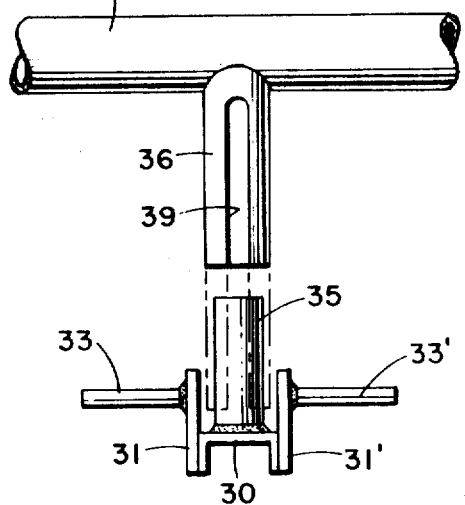
FIG. 6 is an enlarged rear elevation view of the forward dolly assembly.

The detailed construction and assembly of the forward dolly truck 22 is best seen in FIGS. 4, 5, and 6. A bed plate or channel 30 is provided with opposing axle mounting plates 31, 31' and opposing tongue mounting plates 32, 32'. Stub axles 33, 33' are welded to plates 31, 31' respectively. Wheel 34 is journaled to axle 33, and wheel 34' is journaled to axle 33'. The journal fittings of these wheels may and preferably do comprise ball bearings to reduce friction. The U-frame support and elevating means is a vertically extending telescoping compression member comprising a lower inner guide sleeve 35, an upper outer guide sleeve 36 concentric about sleeve 35, and a hydraulic ram 37 mounted within sleeves 35 and 36. Sleeve 35 is welded to bed plate 30 and projects upwardly therefrom. Sleeve 36 depends from and is welded to superjacent transverse beam 13. Sleeves 35 and 36 are coaxially aligned and are in slidable, slip-fitting engagement with each other, whereby the dolly 22 is freely rotatable about a vertical axis relative to the U-frame 10 and, at the same time, the U-frame is freely elevatable over a predetermined span relative to the dolly 22. Hydraulic oil is delivered from hand pump 23 to ram 37 via tubing 38. An elongated vertical slot 39 is cut in the rear wall of the outer sleeve 36 to furnish access for installation of the hydraulic operator and to provide clearance for the connecting pressure tubing. The dolly assembly is completed by a tongue or tow bar 40, which is pivotally connected to mounting plates 32, 32' by a bolt 41. The forward end of the tongue can be fitted with a conventional female ball joint coupling (not illustrated) for attachment to a tow truck, tractor or other self-propelled vehicle.

Figure 7:
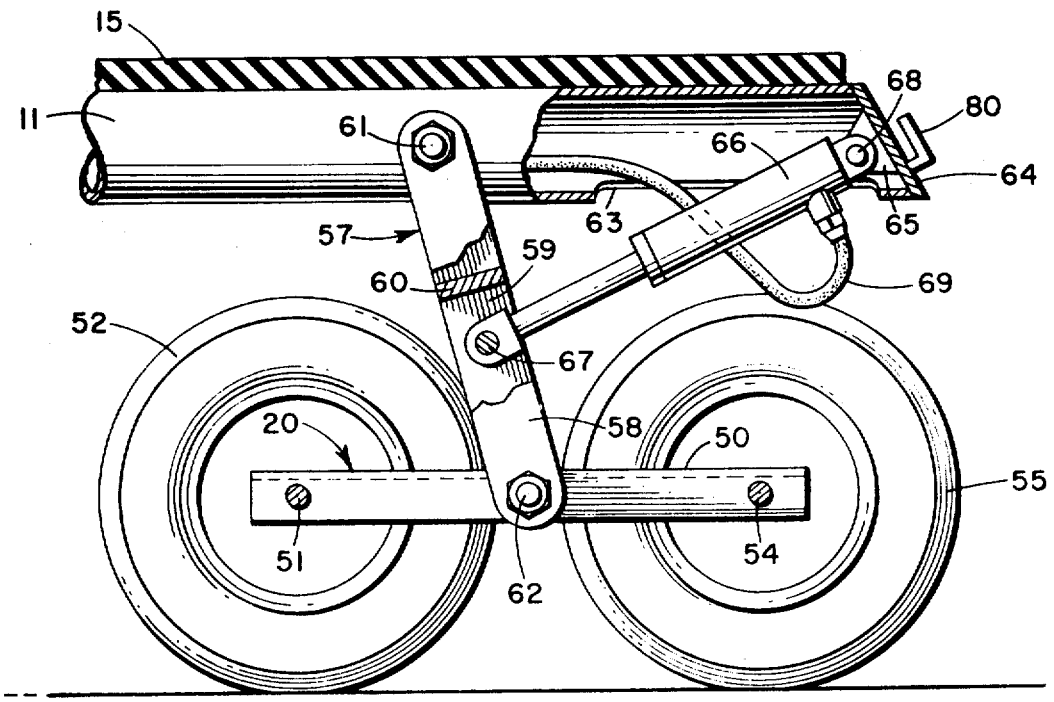
FIG. 7 is an enlarged side elevation view of an after truck unit.
Figure 8:
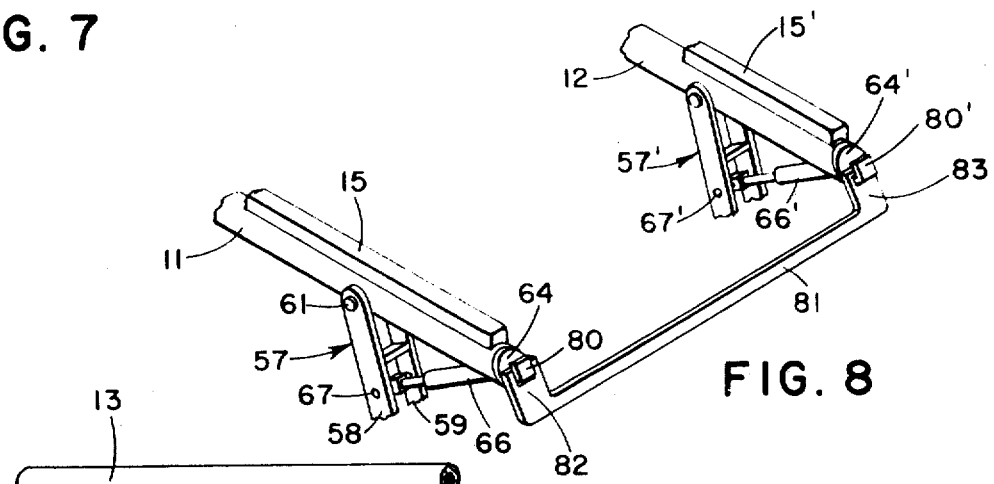
FIG. 8 is an isometric view of the after portion of the U-frame member showing the use of a disconnectable frame-reinforcing crossbar.

The detailed construction and assembly of the after truck units and their respective extensible frame supporting members is best seen in FIGS. 4, 7, and 8. FIG. 7 is a side elevation view of after port truck 20 with the outboard wheels cut away. It will be understood that starboard truck 21 is identical to truck 20, and corresponding elements of the starboard truck bear the same numerals except primed. As shown in FIGS. 4 and 7, the port truck is built around a bedplate or channel section 50 which carries a front axle 51 and a rear axle 54. Wheels 52 and 53 are journaled to axle 51, and wheels 55 and 56 are journaled to axle 54. The journal fittings of all wheels may and preferably do comprise ball bearings to reduce friction. The extensible frame supporting member is a fully pivoted Y-frame defined by a rigid strut 57 and a hydraulic ram 66, the latter, of course, being extendable and retractable. Strut 57 is, in turn, composed of parallel laterally spaced side bars 58 and 59 which are joined together by an intermediate batten plate 60. The upper end of strut 57 brackets the superjacent longitudinal beam 11 and is pivotally connected thereto by a pin or bolt 61. The lower end of strut 57 brackets the bedplate 50 and is pivotally connected thereto by a pin or bolt 62. An elongated slot 63 formed in the bottom of the after end portion of beam 11 furnishes operating clearance for ram 66. The after end of beam 11 is angularly cut, as illustrated, across which opening is welded an endcap 64. A pivot bracket 65 is attached to the inner face of endcap 64. Hydraulic ram 66 is pivotally connected at its upper end by a pin 68 which in turn connects with bracket 65. The lower end or operating rod of ram 66 is pivotally connected to strut 57 by pin 67 at a locus intermediate the pivot points 61, 62. Hydraulic fluid is supplied to operator 66 by small bore copper tubing 69. Tubing 69 is conveniently run lengthwise through the hollow interior of beam 11 to connect with hand pump 25 at the forward end of the boat carrier. As ram 66 is extended upwardly and rearwardly from its most retracted position, strut 57 will rotate in the clockwise direction about pivot point 62, and longitudinal beam member 11 will swing upwardly and rearwardly relative to truck 20.

It will be observed that, since truck 20 is connected to strut 57 at a single pivot point 62 intermediate axles 51 and 54, the truck is free to undergo at least a limited oscillation or pitching motion in the vertical plane about axis 62. Therefore, when the boat carrier is moving over a rough road, the front and rear wheels of the truck unit can tolerate relatively large vertical displacements whereas the amplitude of the corresponding vertical displacement transmitted to strut 57, and consequently to beam 11, will be relatively small. The starboard truck will, of course, behave the same way; however, since the port and starboard trucks are independent of each other, their pitching motions need not be synchronous. Such attenuation of road shock by "teeter-totter" effect is very advantageous because it eliminates the need for a spring suspension system.

It will also be observed that composite strut 57 has substantial width and rigidity and that it brackets or straddles both the beam 11 and bedplate 50 at pivot points 61 and 62 respectively. The resulting restraint against torsional displacement substantially precludes any swivel or yawing motion of truck 20 about a vertical axis relative to beam 11. Proper alignment of the longitudinal beams and parallelism of the after truck units are thereby readily maintained regardless of whether the boat carrier is being towed or pushed.

The problem of "spreading" has previously been alluded to. The geometry of a typical boat hull takes the form of a V-shaped or downwardly convex arcuate or gull-wing cross-section, any of which cause the hull to act as a wedge-shaped load upon the U-frame. With a pure U configuration, the longitudinal members 11 and 12 can be treated as cantilever beams. The magnitude of the horizontal load component acting on these beams increases with weight of the boat and/or hull angle and may be appreciable. Therefore, to reduce the maximum lateral deflection of the longitudinal beams as well as to preclude excessive bending stresses from developing therein, we have found it advisable, under certain conditions, to employ a disconnectable tension member or tie bar connecting the after ends of the longitudinal beams. These conditions are: when the weight of the boat approaches the maximum rated capacity of the carrier, the relatively long hauls, or when the route to be traveled is rough.

The use of such tie bar is illustrated in FIG. 8. The endcaps 64, 64' are provided with L-shaped lugs 80 and 80' respectively. The tie bar itself comprises a straight transverse section 81 terminating in short upwardly projecting legs 82, 83. These legs are provided with slots which align with and engage lugs 80, 80'. The purpose of this design is to prevent the tie bar from coming into load-bearing contact with the bottom of the hull of the boat, inasmuch as the transom of a boat of customary size will substantially overhang the after end of the U-frame. The tie bar is removed before the carrier is backed into position beneath the boat. When this is accomplished, the tie bar is then hand connected across the after ends of the U-frame before the U-frame is elevated to lift the boat. It will be appreciated that the tie bar is subject to tensile loading only and is free of beam loading. Its effect is to convert a simple cantilever beam to a restrained cantilever beam, thereby substantially rigidifying the U-frame member.

The mode of operation of our invention is explained with reference to FIGS. 1, 2, 3, and 4. In FIG. 1, the boat carrier is shown backed into position beneath a boat indicated by dashed line 28. The fixed or onground support of boat 28 is, in this example, comprised of a forward sawbuck 26 and an after sawbuck 27. The carrier straddles the forward sawbuck. It need not straddle the after sawbuck but can be pushed right up to it since the after sawbuck supports the boat just forward of the transom. When the carrier is being pushed into position under the boat, it is, of course, in the down or retracted position as shown in FIG. 2. The workman will then operate in sequence selected ones of handpumps 23, 24, and 25, or any two simultaneously as desired, so that the U-frame 10 will be elevated in a substantially horizontal plane. In FIG. 3, the carrier is shown in a more fully extended elevated position. The degree of elevation need only be sufficient to lift the boat clear of its on-ground support. Since the after truck units 20 and 21 are pivotally connected to U-frame 10 by the above described Y-frame assembly, whereas the dolly truck 22 is restrained from longitudinal motion relative to the U-frame, the after truck units will move forward a short distance as the boat is engaged and raised. At this point, the assembly is in a towing or movable position. In FIG. 4, the boat 28 is shown resting upon pads 15 and 15' and also upon keel rest 16. The regions of contact are over elongated areas on either side of the keel and parallel therewith and also under the keel just aft of the bow. This provides a very stable support platform, and no hull bracing or other auxiliary supports are required. It will also be noted that the after trucks 20 and 21 are disposed completely beneath the hull. By virtue of the compact construction of the boat carrier and the free-wheeling action of the forward dolly, the entire carrier with boat on it is so maneuverable that it can be moved into or out of a space exactly the width of the boat or exactly the width of the carrier. If the ground is level enough, the boat carrier can be towed by hand. In the case of rough or hilly terrain, it is preferable to employ a tow truck or small tractor.

Although we do not intend the scope of our invention to be limited as to size, an example of suitable dimensions is given below:

| | |
|---|---|
| U-frame construction | 3'' ID steel pipe |
| Length of U-frame | 10 feet |
| Width of carrier (lateral spacing between inboard wheels of after trucks) | 40 inches |

The weight capacity of this boat carrier is approximately 4,500 lbs. The boat length capacity is about 24 feet with the usual beam of a boat of that length. Of course, it can accommodate smaller boats also. It is of optimum size to handle outboards and runabouts which predominate in any boat yard.

Those skilled in the art will be cognizant that many variations of the apparatus specifically described herein are included within the broad scope of our invention. For example, in lieu of tubular members, the U-frame may be constructed of I-beams, WF-beams or trussed beams. Instead of a plurality of hydraulic pumps, one may utilize a single pump having a common discharge to several hydraulic rams. In the latter event, it may be desirable to incorporate appropriate flow metering means so that equal aliquots of oil are dispensed to the cylinders during each pump stroke. The hydraulic pump or pumps may be motor driven if desired. And as indicated supra one may use, instead of oil, a compressible fluid such as compressed air, high pressure nitrogen or carbon dioxide. With respect to the after truck and dolly units, the number of wheels per unit may be greater or lesser than those specifically illustrated.

By way of summary, the advantages of our invention are many. The boat carrier is light and durable and does not require any special skills to operate. Most importantly, it immediately eliminates the need for two or three extra men to move boats from one place to another in a boat yard, show room or on used and new boat display lots. The ease with which this can be done makes the boat carrier attractive for any boat yard operator or boat dealer because he can quickly pull a boat out from a "line-up" either for moving to another place or for showing purposes.

We claim as our invention:

1. A boat carrier comprising 1. a substantially horizontal U-frame member defined by a pair of laterally spaced apart substantially parallel port and starboard longitudinal beam members and a transverse beam member connecting the forward ends of said longitudinal beam members, the after end of the U-frame being open and the area bounded by the U-frame being unobstructed from its after end throughout substantially its entire length;

2. a first multiple wheeled truck unit positioned beneath said port beam member;

3. a second multiple wheeled truck unit positioned beneath said starboard beam member, the space between said first and second truck units being unobstructed;

4. each of said first and second truck units comprising a bed plate having an after end and a forward end, a first pair of laterally spaced apart wheels having a first common axis of rotation journaled to one end of the bed plate, at least one other wheel having a second axis of rotation journaled to the other end of the bed plate;

5. first and second extensible frame supporting members each connecting a corresponding one of said first and second truck units with and supporting its respective superjacent longitudinal beam member, each of said frame supporting members including an upwardly extensible hydraulic ram means arranged to elevate the longitudinal beam member relative to the truck unit, each of said frame supporting members comprising a strut member pivotally connected at its upper end to the longitudinal beam member and pivotally connected at its lower end to the bed plate of its associated truck unit at a locus intermediate said first and second axes of rotation, said hydraulic ram means being pivotally connected to said strut member at a locus intermediate the ends thereof and also pivotally connected at its opposite end to said longitudinal beam member at a locus which is longitudinally spaced from the point of pivotal attachment of said strut member to said longitudinal beam member, the upper end of said strut member bracketing its respective superjacent longitudinal beam member and the lower end of said strut member bracketing said bed plate whereby to maintain said first and second axes of rotation perpendicular to said longitudinal beam member and to substantially preclude rotation of its respective truck unit about a vertical axis;

6. fluid dispensing means providing controlled volumes of fluid under pressure in fluid communication with said hydraulic ram means, said dispensing means in combination with said hydraulic ram means being operative to raise or lower said U-frame member in a substantially horizontal plane; and 7. said U-frame member being further characterized in that said longitudinal beam members, either alone or together with said forward transverse beam member, constitute the sole members of the boat carrier which contact and support the hull of the boat to be transported.

2. The boat carrier of claim 1 further characterized in that said first and second truck units are positioned beneath the after end portions of said longitudinal beam members.

3. The boat carrier of claim 1 further characterized in that a dolly truck unit is positioned beneath said forward transverse beam member at a locus approximately midway between said longitudinal beam members, and a vertical telescoping compression member, including upwardly extensible hydraulic ram means, connects said dolly truck unit with and supports said transverse beam member.

4. The boat carrier of claim 3 wherein said dolly truck unit has a pair of wheels on a common axis of rotation.

5. The boat carrier of claim 4 further characterized in that said telescoping compression member is constructed and arranged to permit substantial rotation of the dolly truck unit relative to forward line of travel.

6. The boat carrier of claim 3 further characterized in the provision of a disconnectable tie bar connecting the after end portions of said port and starboard longitudinal beam members, said tie bar serving to rigidify said U-frame member when the latter is under load, and said tie bar being constructed and arranged to be free of load bearing contact with the hull of the boat to be transported.

7. A boat carrier comprising
 1. a substantially horizontal U-frame member defined by a pair of laterally spaced apart substantially parallel port and starboard longitudinal beam members and a transverse beam member connecting the forward ends of said longitudinal beam members, the after end of the U-frame being open and the area bounded by the U-frame being unobstructed from its after end throughout substantially its entire length;
 2. a first multiple wheeled truck unit positioned beneath the after end of said port beam member;
 3. a second multiple wheeled truck unit positioned beneath the after end of said starboard beam member, the space between said first and second truck units being unobstructed;
 4. each of said first and second truck units comprising a bed plate having an after end and a forward end, a first pair of laterally spaced apart wheels having a first common axis of rotation journaled to said forward end of the bed plate, a second pair of laterally spaced apart wheels having a second common axis of rotation journaled to said after end of the bed plate;
 5. first and second extensible frame supporting members each connecting a corresponding one of said first and second truck units with and supporting its respective superjacent longitudinal beam member, each of said frame supporting members including an upwardly extensible hydraulic ram means arranged to elevate the longitudinal beam member relative to the truck unit, each of said frame supporting members comprising a strut member pivotally connected at its upper end to its respective longitudinal beam member and pivotally connected at its lower end to the bed plate of its associated truck unit at a locus intermediate said first and second axes of rotation, said hydraulic ram means being pivotally connected to said strut member at a locus intermediate the ends thereof and also pivotally connected at its opposite end to said longitudinal beam member at a locus which is longitudinally spaced from the point of pivotal attachment of said strut member to said longitudinal beam member, the upper end of said strut member bracketing its respective superjacent longitudinal beam member and the lower end of said strut member bracketing said bed plate whereby to maintain said first and second axes of rotation perpendicular to said longitudinal beam member and to substantially preclude rotation of its respective truck unit about a vertical axis;
 6. a dolly truck unit positioned beneath said forward transverse beam member, and a telescoping compression member, including upwardly extensible hydraulic ram means arranged to elevate the transverse beam member relative to said dolly truck unit, connecting said dolly unit with and supporting said transverse beam member, said compression member being constructed and arranged to permit at least about ±90° rotation of said dolly truck unit relative to forward line of travel;
 7. fluid dispensing means providing controlled volumes of fluid under pressure in fluid communication with said hydraulic ram means, said dispensing means in combination with said hydraulic ram means being operative to raise or lower said U-frame member in a substantially horizontal plane; and
 8. said U-frame member being further characterized in that said longitudinal beam members, either alone or together with said forward transverse beam member, constitute the sole members of the boat carrier which contact and support the hull of the boat to be transported.

* * * * *